United States Patent
Reial et al.

(10) Patent No.: US 9,591,543 B2
(45) Date of Patent: Mar. 7, 2017

(54) HANDOVER CONTROL

(71) Applicant: Telefonaktiebolaget L M Ericsson (publ), Stockholm (SE)

(72) Inventors: Andres Reial, Malmö (SE); Andreas Cedergren, Bjärred (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 14/431,335

(22) PCT Filed: Oct. 8, 2014

(86) PCT No.: PCT/EP2014/071516
§ 371 (c)(1),
(2) Date: Mar. 26, 2015

(87) PCT Pub. No.: WO2016/055101
PCT Pub. Date: Apr. 14, 2016

(65) Prior Publication Data
US 2016/0262074 A1 Sep. 8, 2016

(51) Int. Cl.
*H04W 36/24* (2009.01)
*H04W 36/30* (2009.01)
(Continued)

(52) U.S. Cl.
CPC ....... *H04W 36/24* (2013.01); *H04W 36/0083* (2013.01); *H04W 36/30* (2013.01); *H04W 36/08* (2013.01)

(58) Field of Classification Search
CPC ............. H04W 36/0083; H04W 36/30; H04W 36/0061; H04W 24/02; H04W 36/165; H04W 72/0406; H04W 28/08; H04W 36/24
(Continued)

(56) References Cited

U.S. PATENT DOCUMENTS 7,839,827 B2 * 11/2010 Kwun .................. H04W 36/30
370/331
2004/0106423 A1 6/2004 McGowan et al.
(Continued)

FOREIGN PATENT DOCUMENTS

EP 1032237 A1 8/2000
WO 9859433 A2 12/1998
(Continued)

*Primary Examiner* — Magdi Elhag
(74) *Attorney, Agent, or Firm* — Coats and Bennett, PLLC (57) ABSTRACT

A handover control method for a network node of a cellular communication network may include the network node receiving one or more signals from each of one or more other network nodes. The one or more signals are indicative of a result of uplink signal strength measurements performed by the other network node in relation to a wireless communication device and an available downlink transmission power value of the other network node. The network node then bases a handover decision on an estimated downlink received power of the wireless communication device in relation to the other network node. The estimated downlink received power is based on the result of the uplink signal strength measurements and the available downlink transmission power.

21 Claims, 3 Drawing Sheets (51) Int. Cl.
*H04W 36/00* (2009.01)
*H04W 36/08* (2009.01)

(58) Field of Classification Search
USPC .......................... 455/436–444; 370/331–332
See application file for complete search history.

(56) References Cited

U.S. PATENT DOCUMENTS

| | | | | |
|---|---|---|---|---|
| 2009/0028112 | A1* | 1/2009 | Attar | H04W 36/245 |
| | | | | 370/332 |
| 2012/0129537 | A1* | 5/2012 | Liu | H04W 36/04 |
| | | | | 455/444 |
| 2012/0165021 | A1* | 6/2012 | Jung | H04W 36/0055 |
| | | | | 455/437 |
| 2013/0308473 | A1 | 11/2013 | Sun et al. | |
| 2014/0112260 | A1* | 4/2014 | Sorrentino | H04W 72/0413 |
| | | | | 370/329 |
| 2014/0301368 | A1* | 10/2014 | Chen | H04W 36/0083 |
| | | | | 370/331 |
| 2015/0201360 | A1* | 7/2015 | Ray Chaudhuri | H04W 36/30 |
| | | | | 455/436 |

FOREIGN PATENT DOCUMENTS

| | | |
|---|---|---|
| WO | 9909660 A1 | 2/1999 |
| WO | 2008116027 A2 | 9/2008 |
| WO | 2011095687 A1 | 8/2011 |
| WO | 2014037789 A2 | 3/2014 |

\* cited by examiner

HANDOVER CONTROL

TECHNICAL FIELD

The present invention relates generally to the field of cellular communication networks. More particularly, it relates to handover control in such networks.

BACKGROUND

Handover is a vital part of a typical cellular communication system. A handover is the process of transferring an ongoing connection of a mobile wireless communication device from one (serving) cell to another (target) cell in order to accomplish transparent service over a geographical area that extends over more than one cell. Ideally, the handover should be performed without any loss of data and with as small communication interrupt as possible. Handover decisions are made by one or more network nodes of the cellular communication system. Handovers for the uplink (UL) and the downlink (DL) may be performed together or separately. To provide an illustrative description, this disclosure will focus on the example of downlink handover.

Enabling a handover typically comprises finding a suitable target cell and ensuring that it is possible to sustain reliable communication with the target cell. Candidates for suitable target cells are usually stored in a so-called neighboring cell list which may, for example, be stored at the network node providing the serving cell. Finding a suitable target cell and ensuring that it is possible to sustain reliable communication with the target cell typically comprises comparing current quality properties (e.g. received signal power/strength or similar) of the cells in the neighboring cell list and selecting the target cell according to some criteria (e.g. highest signal power/strength, possibly with a hysteresis).

The current quality properties of a target cell are typically estimated via measurements associated with the downlink of the wireless communication device that is prospectively being handovered. Using downlink measurements for handover decisions typically require that reference symbols are provided in the downlink, that the wireless communication device performs the measurements, and that measurement reports are transmitted in the uplink. Thus, considerable signaling and processing resources are needed for the handover based on downlink measurements to work.

A conceptually more attractive approach is to base the target cell selection for downlink handover on measurements associated with the uplink of the wireless communication device that is prospectively being handovered. According to such an approach, the node providing the serving cell and one or more nodes providing prospective target cells perform measurements of signals from the wireless communication device (e.g. sounding signals, data reference signals). Results of the measurements are reported to a network node which controls the handover (typically the node providing the serving cell) and handover decisions are based on the measurement results.

Such an approach may be particularly attractive in cellular communication systems employing narrow beamforming implemented with advanced antenna systems, wherein handover between the beams (provided by the same network node or by different network nodes) may be necessary. For example, for handover between beams provided by different network nodes, where a wireless communication device would typically have to perform and report measurements for all (of a very large number of) possible beam configurations if handover decisions are based on downlink measurements, the approach of using uplink measurements for handover decisions seems very attractive.

This approach, however, only works robustly if the quality property relation between the uplinks of the considered cells is the same as (or at least very similar to) the quality property relation between the downlinks of the considered cells, which is not always the case. This is not true, for example, in heterogeneous networks where the downlink transmission power typically differs between different network nodes.

Therefore, there is a need for improved handover control methods and arrangements wherein handover decisions are based on uplink measurements.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The notion "cell" is meant to denote any relevant coverage area of a network node, radio base station, access point etc. (e.g. a sector or a beam), and does not necessarily denote a cell associated with a particular reference signal and/or particular identity structures (e.g. cell identity).

It is an object of some embodiments to obviate at least some of the above disadvantages and to provide improved handover control methods and arrangements wherein handover decisions are based on uplink measurements.

According to a first aspect, this is achieved by a handover control method of a network node of a cellular communication network.

The method comprises (for each of one or more other network nodes of the cellular communication network) receiving one or more signals from the other network node, wherein the one or more signals are indicative of:
  a result of uplink signal strength measurements performed by the other network node in relation to a wireless communication device operating in association with the cellular communication network, and
  an available downlink transmission power value of the other network node.

The method also comprises (for each of the one or more other network nodes of the cellular communication network) basing a handover decision on an estimated downlink received power of the wireless communication device in relation to the other network node, wherein the estimated downlink received power is based on the result of the uplink signal strength measurements and the available downlink transmission power.

The method of the first aspect may be performed by a network node controlling handover decisions. Such a network node may, for example, be the base station providing the serving cell or another network node (e.g. a centralized server node, a centralized control unit, etc.).

The available downlink transmission power value may, for example, be defined by a physical capability of the network node (e.g. the maximum possible transmission power of the network node). Alternatively or additionally, the available downlink transmission power value may, for example, be defined by a current configuration of the network node (e.g. a currently used transmission power). The latter may be particularly relevant for network nodes that employ dynamic adjustment of transmission power.

The handover decision typically comprises a downlink handover decision, but may additionally comprise an uplink handover decision.

The estimation of the downlink received power of the wireless communication device may, for example, be expressed as an absolute value for each cell under consideration (serving and prospective) and/or as a relative value for each prospective cell compared to the serving cell.

According to some embodiments, receiving the one or more signals from the other network node ay comprise receiving an indication of the available downlink transmission power value of the other network node and receiving the uplink signal strength measurements performed by the other network node.

In such embodiments, the method may further comprise compensating the uplink signal strength measurements based on the available downlink transmission power.

The downlink received power of the wireless communication device may be estimated based on the compensated uplink signal strength measurements.

According to some embodiments, receiving the one or more signals from the other network node may comprise receiving compensated uplink signal strength measurements, wherein the compensated uplink signal strength measurements comprise the uplink signal strength measurements performed by the other network node compensated based on the available downlink transmission power value of the other network node.

The downlink received power of the wireless communication device may be estimated based on the compensated uplink signal strength measurements.

In some embodiments, basing the handover decision on the estimated downlink received power of the wireless communication device in relation to the other network node may comprise comparing the compensated uplink signal strength measurements of the other network node with compensated uplink signal strength measurements of a serving network node and determining to hand over the wireless communication device to the other network node if a ratio of the compensated uplink signal strength measurements of the other network node to the compensated uplink signal strength measurements of the serving network node exceeds a threshold value.

In a typical embodiment, the threshold value may be equal to 1.

A second aspect is a method of a network node of a cellular communication network. The method comprises performing uplink signal strength measurements in relation to a wireless communication device operating in association with the cellular communication network, and transmitting one or more signals to another network node.

The one or more signals are indicative of a result of the uplink signal strength measurements and an available downlink transmission power value of the network node.

The result of the uplink signal strength measurements and the available downlink transmission power are for handover control by the another network node comprising basing a handover decision on an estimated downlink received power of the wireless communication device in relation to the other network node, wherein the estimated downlink received power is based on the result of the uplink signal strength measurements and the available downlink transmission power.

The network node performing the method of the second aspect may, for example, be a base station providing a prospective cell for handover.

In some embodiments, the same network node (e.g. a base station) may be adapted to perform both the handover control method of the first aspect and the method of the second aspect.

According to some embodiments, transmitting the one or more signals may comprise transmitting an indication of the available downlink transmission power value of the network node and transmitting the uplink signal strength measurements performed by the network node.

Transmitting an indication of the available downlink transmission power value of the network node may, according to some embodiments, be performed in relation to one or more of the following events:
- when the network node is activated,
- when the downlink transmission power value of the network node is altered, and
- when a certain (e.g. predetermined) time has elapsed since a previous transmission of the indication of the available downlink transmission power.

In some embodiments, the method may further comprise compensating the uplink signal strength measurements based on the available downlink transmission power. In such embodiments, transmitting the one or more signals may comprise transmitting the compensated uplink signal strength measurements.

A third aspect is a computer program product comprising a computer readable medium, having thereon a computer program comprising program instructions, the computer program being loadable into a data-processing unit and adapted to cause the data-processing unit to execute method steps according to the first and/or second aspect when the computer program is run by the data-processing unit.

A fourth aspect is a handover control arrangement for a network node adapted to operate as part of a cellular communication network.

The arrangement comprises a receiver adapted to (for each of one or more other network nodes of the cellular communication network) receive one or more signals from the other network node, wherein the one or more signals are indicative of:
- a result of uplink signal strength measurements performed by the other network node in relation to a wireless communication device operating in association with the cellular communication network, and
- an available downlink transmission power value of the other network node.

The arrangement also comprises a handover controller adapted to base a handover decision on an estimated downlink received power of the wireless communication device in relation to the other network node, wherein the estimated downlink received power is based on the result of the uplink signal strength measurements and the available downlink transmission power.

The arrangement of the fourth aspect may, for example, be comprised in a network node controlling handover decisions. Such a network node may, for example, be the base station providing the serving cell or another network node (e.g. a centralized server node).

In some embodiments, the receiver may be adapted to receive the one or more signals from the other network node as an indication of the available downlink transmission power value of the other network node and the uplink signal strength measurements performed by the other network node.

In such embodiments, the handover controller may be further adapted to compensate the uplink signal strength measurements based on the available downlink transmission power.

In some embodiments, the receiver may be adapted to receive the one or more signals from the other network node as compensated uplink signal strength measurements, wherein the compensated uplink signal strength measurements comprise the uplink signal strength measurements performed by the other network node compensated based on the available downlink transmission power value of the other network node.

The handover controller may, according to some embodiments, be adapted to base the handover decision on the estimated downlink received power of the wireless communication device in relation to the other network node by comparing the compensated uplink signal strength measurements of the other network node with compensated uplink signal strength measurements of a serving network node and determining to hand over the wireless communication device to the other network node if a ratio of the compensated uplink signal strength measurements of the other network node to the compensated uplink signal strength measurements of the serving network node exceeds a threshold value.

A fifth aspect is an arrangement for a network node adapted to operate as part of a cellular communication network.

The arrangement comprises a measurement unit adapted to perform uplink signal strength measurements in relation to a wireless communication device operating in association with the cellular communication network.

The arrangement also comprises a transmitter adapted to transmit one or more signals to another network node. The one or more signals are indicative of a result of the uplink signal strength measurements and an available downlink transmission power value of the network node.

The result of the uplink signal strength measurements and the available downlink transmission power are for handover control by the another network node comprising a handover controller adapted to base a handover decision on an estimated downlink received power of the wireless communication device in relation to the other network node, wherein the estimated downlink received power is based on the result of the uplink signal strength measurements and the available downlink transmission power.

The arrangement of the fifth aspect may, for example, be comprised in a base station providing a prospective cell for handover.

In some embodiments, the transmitter may be adapted to transmit the one or more signals as an indication of the available downlink transmission power value of the network node and the uplink signal strength measurements performed by the network node.

The arrangement may, according to some embodiments, further comprise a compensator adapted to compensate the uplink signal strength measurements based on the available downlink transmission power. In such embodiments, the transmitter may be adapted to transmit the compensated uplink signal strength measurements as the one or more signals.

In some embodiments, the same network node (e.g. a base station) may comprise both the handover control arrangement of the fourth aspect and the arrangement of the fifth aspect.

A sixth aspect is a network node adapted to operate as part of a cellular communication network and comprising one or more of the arrangements of the fourth and fifth aspects.

In some embodiments, the fourth aspect may additionally have features identical with or corresponding to any of the various features as explained above for the first aspect.

In some embodiments, the fifth aspect may additionally have features identical with or corresponding to any of the various features as explained above for the second aspect.

In some embodiments, the third and sixth aspects may additionally have features identical with or corresponding to any of the various features as explained above for the first and/or second aspect.

The signal strength measurements may, for example, be in relation to sounding signals, reference signals, control signals, and/or data signals transmitted by the wireless communication device.

An advantage of some embodiments is that improved handover control methods and arrangements are provided wherein handover decisions are based on uplink measurements.

Another advantage of some embodiments is that handover control based on uplink measurements is robust for various network deployments. Typically, some embodiments may be particularly beneficial for networks where the downlink transmission power may differ between different network nodes. For example, employment of handover control based on uplink measurements to heterogeneous networks is enabled according to some embodiments.

Another advantage of some embodiments is that the additional signaling required is quite low. In some embodiments, there is no additional signaling.

Yet another advantage of some embodiments is that efficient handover management is enabled, requiring a low amount of signaling and processing resources.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where handover decisions (in particular downlink handover decisions) in relation to a wireless communication device are based on uplink signal strength measurements performed by one or more network nodes providing cells considered in the handover decision.

The network nodes supply the result of the uplink signal strength measurements to a network node that performs handover control. The network nodes also supply information regarding their respective available downlink transmission power value to the network node performing handover control. The available downlink transmission power value may, for example, refer to an output power capability of the network node (e.g. a maximum possible downlink transmission power) or to a currently configured (e.g. short-term) downlink transmission power level.

The network node performing handover control may, for example, be a centralized network node (control unit) or the network node (base station) providing the serving cell.

The handover decision is then based on estimated downlink received power of the wireless communication device for each of the considered cells, which is in turn based on the result of the uplink signal strength measurements and the available downlink transmission power values.

The result of the uplink signal strength measurements and the information regarding available downlink transmission power value are either supplied separately or in a combined manner. For example, a network node may compensate its uplink signal strength measurements based on the available downlink transmission power value before supplying them to the network node performing handover control.

The approach according to these embodiments is particularly useful in heterogeneous network deployments where different network nodes may have different downlink power capabilities. Using uplink signal strength measurements directly for downlink handover decisions in such deployments would typically result in poor handover decisions which might in turn lead to suboptimal data link quality, or even radio link failure, for the wireless communication device.

In a typical example, each network node (base station) providing one or more cells signals information regarding its available downlink transmission power value to the network node controlling the handover procedure.

Signaling of the available downlink transmission power value may, for example, be made at setup of the corresponding network node. Alternatively or additionally, signaling of the available downlink transmission power value may be made at some (typically infrequent) update intervals.

For example, the available downlink transmission power value may be supplied to a centralized handover control unit. Alternatively or additionally, each network node may supply the available downlink transmission power value to its neighboring network nodes (which provide cells that may be the serving cell at the time of future handover decisions).

When a handover measurement procedure is triggered for a wireless communication device, each network node providing a candidate cell for handover (and possibly also the network node providing the serving cell, e.g. if the needed information is not already available for the network node providing the serving cell) performs uplink signal strength measurements in relation to the wireless communication device and reports the result to the network node controlling the handover procedure (centralized handover control unit or network node providing the serving cell, as applicable).

The network node controlling the handover procedure may compensate the uplink signal strength measurements with regard to the respective available downlink transmission power value and uses the compensated uplink signal strength measurements for taking a handover decision.

If it is decided to hand over the wireless communication device, the network node controlling the handover procedure initiates the handover according to any suitable (known or future) method.

Figure 1:
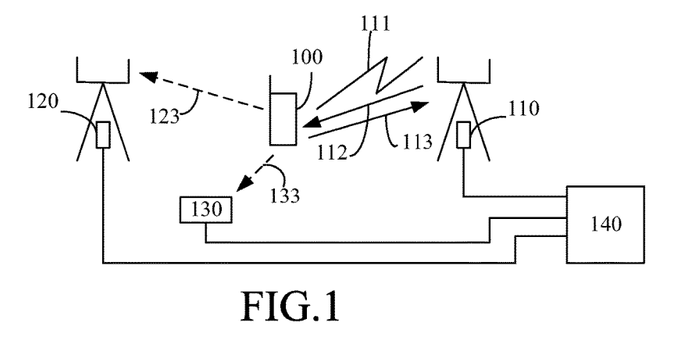
FIG. 1 is a schematic drawing illustrating a scenario where some embodiments may be applicable.

FIG. 1 is a schematic illustration of a scenario where some embodiments may be applicable. A wireless communication device 100 has a communication link 111 with a network node 110 providing the serving cell. The communication link comprises an uplink 113 and a downlink 112.

If a prospective handover is to be evaluated for one or more other cells, the network nodes 120, 130 providing the other cells perform signal strength measurements on the respective uplinks 123, 133 and report the result to a centralized handover control unit 140.

All network nodes 110, 120, 130 of the scenario also supply their available downlink transmission power value to a centralized handover control unit 140.

In other scenarios, the handover control may be de-centralized such that a network node 110 providing the serving cell takes handover decisions. In such scenarios, the network nodes supply their available downlink transmission power value to their neighboring nodes and the signal strength measurement reports to the serving node.

In some of the de-centralized handover scenarios, only some network nodes (e.g. macro nodes of a heterogeneous network) may be capable of controlling handover.

In such scenarios, the macro nodes typically supply their available downlink transmission power value to its neighboring macro nodes and other nodes supply their available downlink transmission power value to a neighboring macro node. The signal strength measurement reports may be sent to the macro node currently in control of the mobility (may or may not be the serving node).

As already discussed, the available downlink transmission power value may be supplied once at setup of a network node, repeatedly (at some time interval), whenever a currently used transmission power of the network node is altered, together with every or some of the signal strength measurement reports, or even combined with the signal strength measurement reports.

The centralized handover control unit 140 makes a handover decision based on the signal strength measurements on the respective uplinks 123, 133 compensated by the respective available downlink transmission power value. Since the network node 130 is a low power node, the compensation ensures a more accurate handover decision than if uplink signal strength measurements where used directly.

Figure 2:
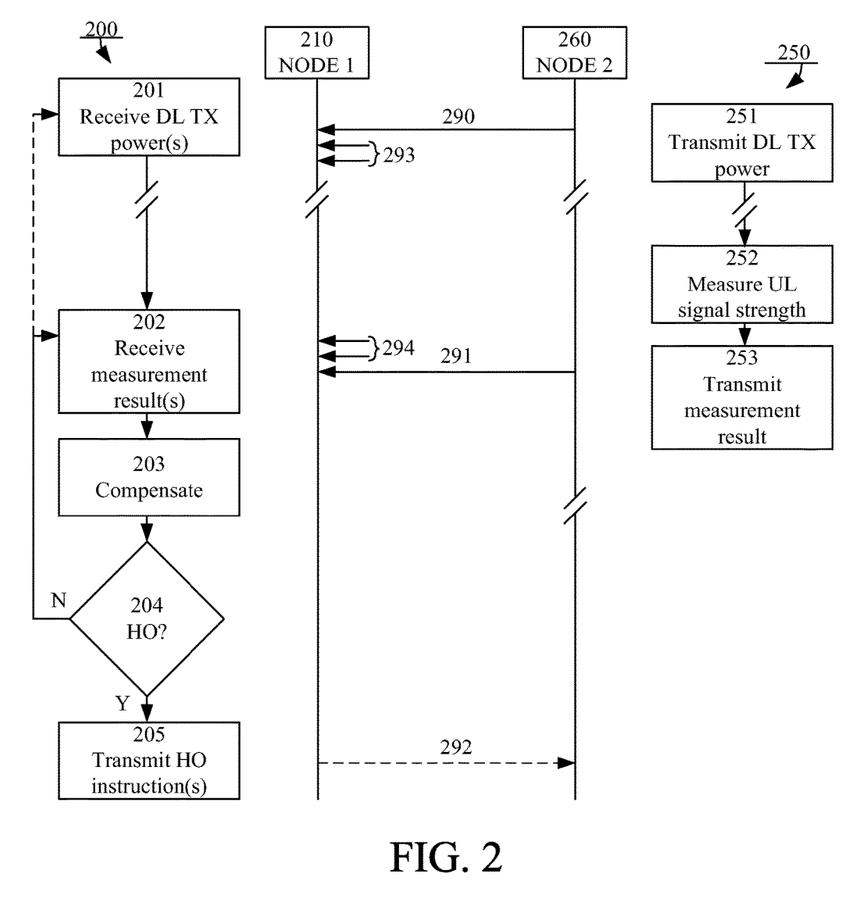
FIG. 2 is a combined flowchart and signaling diagram illustrating example method steps and signaling according to some embodiments.

FIG. 2 illustrates example method steps and signaling for handover control according to some embodiments. The methods and signaling of FIG. 2 involves a first network node (NODE 1) 210 (compare with 110 or 140 of FIG. 1) performing a method 200 and a second network node (NODE 2) 260 (compare with 120 and 130 of FIG. 1) performing a method 250.

The procedure starts in step 251 where the second network node 260 transmits an indication 290 of its available downlink transmission power value (DL TX power) to the first network node 210.

Transmitting the indication of the available downlink transmission power value may, for example, be performed in relation to one or more of the following events:

when the second network node 260 is activated,
when the downlink transmission power value of the second network node 260 is altered,
when a certain time has elapsed since a previous transmission of the indication of the available downlink transmission power, and
when an uplink signal strength measurement report is transmitted (e.g. every or some reports).

In step 201, the first network node 210 receives indications 290, 293 of available downlink transmission power value from the second network node 260 and possibly other network nodes.

When a handover measurement procedure is triggered (according to any suitable known or future principles) for a wireless communication device, the second network node 260 performs uplink (UL) signal strength measurements in relation to the wireless communication device in step 252 and transmits a report 291 comprising the result of the measurements to the first network node 210 in step 253.

In step 202, the first network node 210 receives reports 291, 294 of uplink signal strength measurements from the second network node 260 and possibly other network nodes.

For each of the received reports, the first network node 210 compensates the uplink signal strength measurements based on the available downlink transmission power transmitted by the respective network node to estimate respective downlink received powers of the wireless communication device.

In step 204, the first network node 210 determines, based on estimated downlink received powers, whether and to which cell the wireless communication device is to be handed over.

Step 204 may, for example, comprise comparing a ratio of the compensated uplink signal strength measurements of a prospective cell (e.g. provided by the second network node 260) to the compensated uplink signal strength measurements of the serving cell to a threshold value (e.g. 1), and making the handover decision based on the comparison.

If it is determined to not hand over the wireless communication device (N-path out from step 204), the method returns to step 202 awaiting new uplink signal strength measurement reports.

Furthermore, new indications of available downlink transmission power values may be received from one or more network nodes at any suitable time, as indicated by the dashed line to step 201.

If it is determined to hand over the wireless communication device (Y-path out from step 204), the first network node transmits handover (HO) instructions 292 to the applicable network nodes (the second network node 260 in this example) according to any suitable known or future handover protocol.

Figure 3:
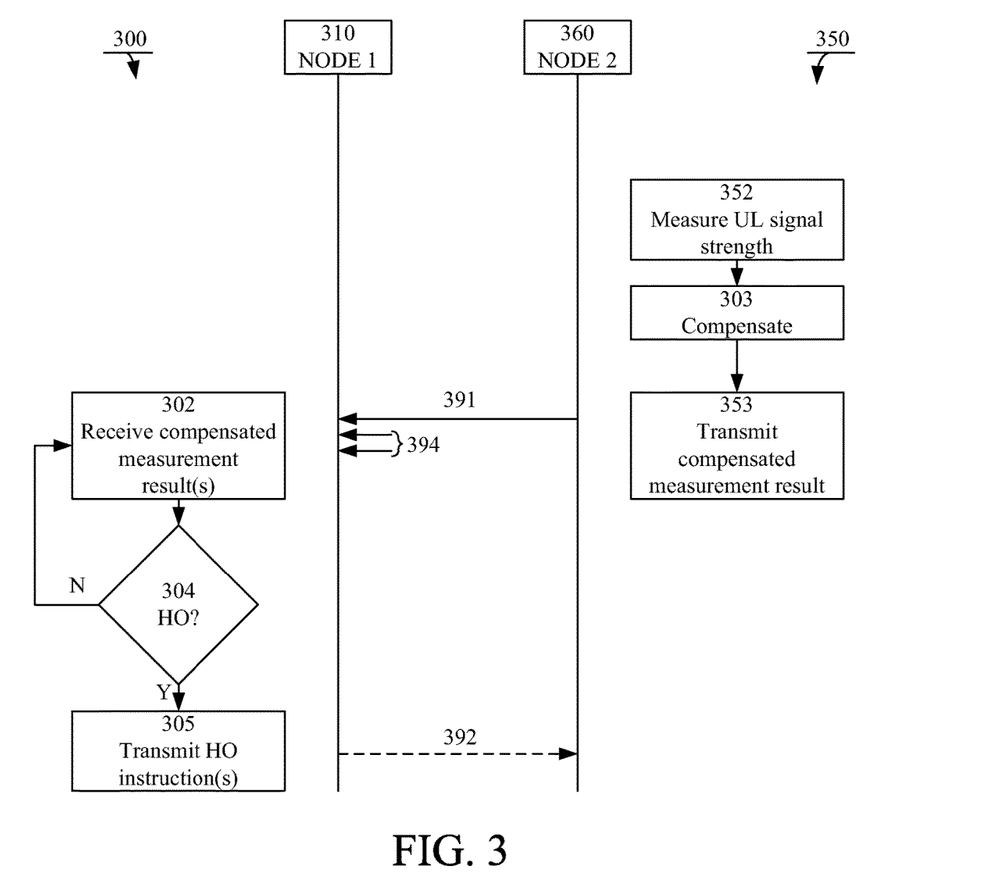
FIG. 3 is a combined flowchart and signaling diagram illustrating example method steps and signaling according to some embodiments.

FIG. 3 illustrates example method steps and signaling for handover control according to some embodiments. The methods and signaling of FIG. 3 involves a first network node (NODE 1) 310 (compare with 110 or 140 of FIG. 1) performing a method 300 and a second network node (NODE 2) 360 (compare with 120 and 130 of FIG. 1) performing a method 350.

When a handover measurement procedure is triggered (according to any suitable known or future principles) for a wireless communication device, the second network node 360 performs uplink (UL) signal strength measurements in relation to the wireless communication device in step 352.

In step 303, the second network node 360 compensates the uplink signal strength measurements based on its available downlink transmission power to estimate a downlink received power of the wireless communication device.

In step 353, the second network node 360 transmits a report 391 comprising the compensated uplink signal strength measurements to the second network node 310.

In step 302, the first network node 310 receives reports 391, 394 of compensated uplink signal strength measurements from the second network node 360 and possibly other network nodes.

In step 304, the first network node 310 determines, based on estimated downlink received powers (e.g. the compensated uplink signal strength measurements), whether and to which cell the wireless communication device is to be handed over.

Step 304 may, for example, comprise comparing a ratio of the compensated uplink signal strength measurements of a prospective cell (e.g. provided by the second network node 360) to the compensated uplink signal strength measurements of the serving cell to a threshold value (e.g. 1), and making the handover decision based on the comparison.

If it is determined to not hand over the wireless communication device (N-path out from step 304), the method returns to step 302 awaiting new compensated uplink signal strength measurement reports.

If it is determined to hand over the wireless communication device (Y-path out from step 304), the first network node transmits handover (HO) instructions 392 to the applicable network nodes (the second network node 360 in this example) according to any suitable known or future handover protocol.

Figure 4:
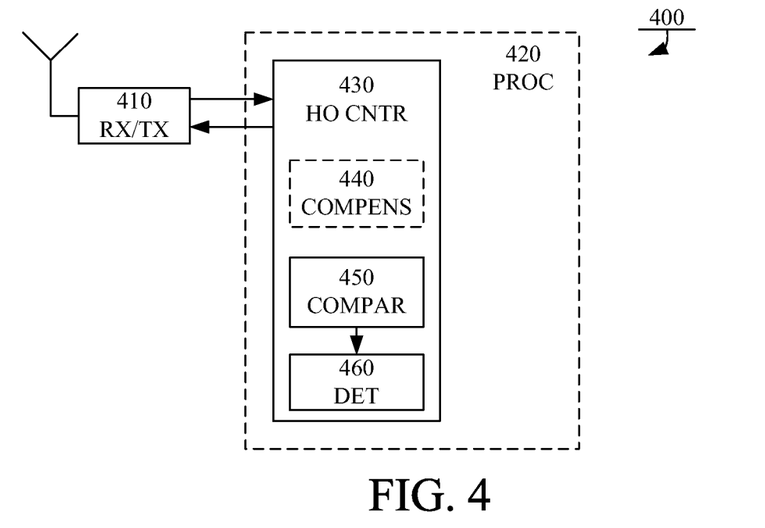
FIG. 4 is a block diagram illustrating an example arrangement according to some embodiments.

FIG. 4 illustrates an example arrangement 400 according to some embodiments. The arrangement 400 may, for example, be comprised in a network node (e.g. a base station or a centralized handover control unit, compare with 110 or 140 of FIG. 1, 210 of FIG. 2 and 310 of FIG. 3). The arrangement 400 may, for example, be adapted to perform one or more of the methods as described in connection to FIGS. 2 and 3.

The arrangement 400 comprises a transceiver (RX/TX) 410 and a handover controller (HO CNTR) 430, which may be implemented by a processor (PROC) 420. The handover controller 430 may comprise a compensator (COMPENS) 440, a comparator (COMPAR) 450 and a determiner (DET) 460.

The receiver part of the transceiver 410 is adapted to receive one or more signals from each of one or more other network nodes, wherein the one or more signals are indicative of a result of uplink signal strength measurements (performed by the other network node in relation to a wireless communication device) and an available downlink transmission power value of the other network node (compare with steps 201 and 202 of FIG. 2 and step 302 of FIG. 3).

The handover controller 430 is adapted to base a handover decision (compare with step 204 of FIG. 2 and step 304 of FIG. 3) on downlink received powers of the wireless communication device, estimated by compensating the uplink signal strength measurements by the available downlink transmission power.

The compensation of the uplink signal strength measurements may be performed by the compensator 440 (compare with step 203 of FIG. 2). Alternatively, the compensation is already done by the other network node (compare with step 303 of FIG. 3) and the receiver receives the compensated uplink signal strength measurements as the one or more signals.

The handover controller 430 may, for example, be adapted to make the handover decision by comparing a ratio of the compensated uplink signal strength measurements of a prospective cell to the compensated uplink signal strength measurements of the serving cell to a threshold value (e.g. 1), and making the handover decision based on the comparison. The comparison may be performed by the comparator 450 and the determiner 460 may determine whether to handover and to which cell based on the comparison.

The transmitter part of the transceiver 410 is adapted to transmit handover instructions to the applicable network node (compare with step 205 of FIG. 2 and step 305 of FIG. 3) if it is determined to hand over the wireless communication device.

Figure 5:
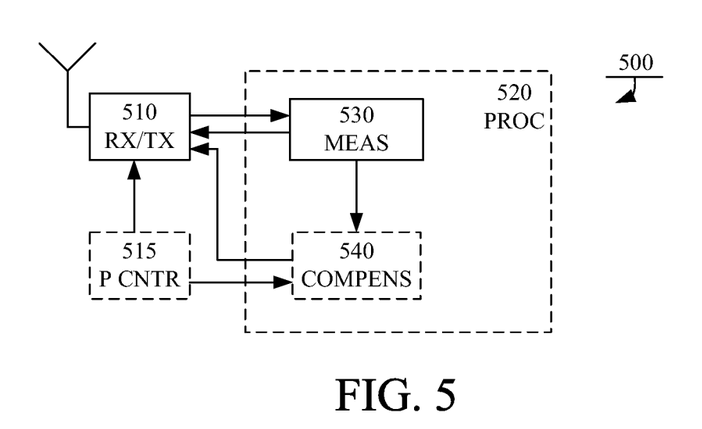
FIG. 5 is a block diagram illustrating an example arrangement according to some embodiments.

FIG. 5 illustrates an example arrangement 500 according to some embodiments. The arrangement 500 may, for example, be comprised in a network node (e.g. a base station, compare with 120 and 130 of FIG. 1, 260 of FIG. 2 and 360 of FIG. 3). The arrangement 500 may, for example, be adapted to perform one or more of the methods as described in connection to FIGS. 2 and 3.

The arrangement 500 comprises a transceiver (RX/TX) 510 and a measurement unit (MEAS) 530. The arrangement may also comprise a compensator (COMPENS) 540 and a power controller (P CNTR) 515. One or more of the measurement unit 530 and the compensator 540 may be implemented by a processor (PROC) 520.

The measurement unit 530 is adapted to perform uplink signal strength measurements in relation to a wireless communication device subject to handover decision.

The transmitter part of the transceiver 510 is adapted to transmit one or more signals to a network node having handover control, wherein the one or more signals are indicative of a result of the uplink signal strength measurements and an available downlink transmission power value of the network node comprising the arrangement 500 (compare with steps 251 and 253 of FIG. 2 and step 353 of FIG. 3).

As elaborated on above, the available downlink transmission power value may indicate a capability of the network node (in which case it is typically a static value) or a current configuration of the network node (in which case it may typically be varying). The available downlink transmission power value may be provided by the power controller 515.

The network node having handover control may base a handover decision on downlink received powers of the wireless communication device, estimated by compensating the uplink signal strength measurements by the available downlink transmission power.

The compensation of the uplink signal strength measurements may be performed by the network node having handover control. Alternatively, the compensation may be done by the other network node comprising the arrangement 500 (e.g. by the compensator 540, compare with step 303 of FIG. 3) and the transmitter transmits the compensated uplink signal strength measurements as the one or more signals.

In some embodiments, the arrangements 400 and 500 of FIGS. 4 and 5 may be combined to a single arrangement comprised in a network node.

A general example of handover principles will now be given, which may be applied to any of the above embodiments as suitable.

In a typical handover decision scenario, a wireless communication device (a user equipment—UE—will be used as an example in the following) is located at or near the border between two or more cells, and the handover decision concerns whether or not the wireless communication device should stay with its current (serving) cell or be handed over to another cell, and—in the latter case—which cell it should be handed over to.

If the UE transmits a predetermined UL reference signal (e.g. sounding reference signal—SRS, mobility reference signals—MRS, demodulation reference signals—DMRS, etc.), the nodes of the candidate cells may perform UL signal measurements of the signal(s) transmitted by the UE to estimate an UL signal property (e.g. the average UL received signal power, compare with steps 252 and 352). The average UL received signal power from UE j as measured at network node k may be modeled as $$S_{k,j}^{(UL)} = P_j^{(TXUL)} A_j^{(TXDL)} G_{k,j}^{(UL)} A_k^{(RXUL)} C_k^{(RXUL)},$$

where the terms denote the following components in the link budget:

$P_j^{(TXUL)}$: UL TX power of UE j, $A_j^{(TXDL)}$: UL TX antenna gain of UE j (incl. beamforming/precoding), $G_{k,j}^{(UL)}$: path loss of the propagation channel UE j→network node k, $A_k^{(RXUL)}$: UL RX antenna gain at network node k (incl. beamforming/precoding), and $C_k^{(RXUL)}$: UL RX RF (radio frequency) losses at network node k.

The UL measurements $S_{k,j}^{(UL)}$ are reported by the network nodes k=1 ... K providing the candidate cells (compare with steps 253, 202, 353, 302). In the case of considering handover between beams, the nodes may be selected e.g. based on a beam mobility activation list.

The purpose of the UL measurements is to infer the average DL received signal power at the UE j from network nodes k=1 ... K (typically in the form of relative values). The DL power at node k may be modeled as $$S_{k,j}^{(DL)} = P_k^{(TXDL)} C_k^{(TXDL)} A_k^{(TXDL)} G_{j,k}^{(DL)} A_j^{(RXDL)} C_j^{(RXDL)},$$

where $P_k^{(TXDL)}$: DL TX power (at the power amplifier—PA) at network node k, $C_k^{(TXDL)}$: DL TX RF losses at network node k, $A_k^{(TXDL)}$: DL TX antenna gain at network node k (incl. beamforming/precoding), $G_{j,k}^{(DL)}$: path loss of the propagation channel node k→UE j, $A_j^{(RXDL)}$: DL RX antenna gain of UE j (incl. beamforming/precoding), and $C_j^{(RXDL)}$: DL RX RF losses of UE j.

Considering a case with two candidate cells (k=1, 2, one of which may or may not be the serving cell), a typical quantity of interest for making the handover decision is the DL power ratio between the candidate cells:

$$\frac{S_{1,j}^{(DL)}}{S_{2,j}^{(DL)}} = \frac{P_1^{(TXDL)} C_1^{(TXDL)} A_1^{(TXDL)} G_{j,1}^{(DL)}}{P_2^{(TXDL)} C_2^{(TXDL)} A_2^{(TXDL)} G_{j,2}^{(DL)}} = \frac{P_1^{(TXDL,eff)} A_1^{(TXDL)} G_{j,1}^{(DL)}}{P_2^{(TXDL,eff)} A_2^{(TXDL)} G_{j,2}^{(DL)}},$$

while the following may be obtained from the reported UL measurements:

$$\frac{S_{1,j}^{(UL)}}{S_{2,j}^{(UL)}} = \frac{G_{1,j}^{(UL)} A_1^{(RXUL)} C_1^{(RXUL)}}{G_{2,j}^{(UL)} A_2^{(RXUL)} C_2^{(RXUL)}}.$$

Due to physical reciprocity of the propagation channel, $G_{k,j}^{(UL)} = G_{j,k}^{(DL)}$, and assuming the same antenna settings in UL and DL $A_j^{(RXUL)} = A_j^{(TXDL)}$ (in advanced beamforming systems, one of the main advantages of the UL measurement approach it the ability to evaluate different DL beamforming options by applying the same beam forms in the UL).

Thus, the DL power ratio may be estimated by applying an adjustment factor (compare with steps 203 and 303) to the UL received power ratio according to:

$$\left(\frac{\hat{S}_{1,j}^{(\overline{DL})}}{S_{2,j}^{(DL)}}\right) = \left(\frac{S_{1,j}^{(UL)}}{S_{2,j}^{(UL)}}\right)\left(\frac{P_1^{(TXDL,\mathit{eff})}}{P_2^{(TXDL,\mathit{eff})}}\frac{C_2^{(RXUL)}}{C_1^{(RXUL)}}\right),$$

and the downlink handover decision may then be made based on the downlink power ratio estimate as:

$$\left(\frac{\hat{S}_{1,j}^{(\overline{DL})}}{S_{2,j}^{(DL)}}\right) \geq 1.$$

When there are more than two candidate cells, the ratios between each pair of cells (or the ratios for each pair comprising the serving cell) may provide the desired ordering. Alternatively, the downlink power of the individual network nodes may be used in absolute terms if an absolute value of at least one of the powers is available, e.g. the one measured at the network node providing the serving cell.

$P_k^{(TXDL,\mathit{eff})} = P_k^{(TXDL)} C_k^{(TXDL)}$ is the effective transmitted power from network node k, and may be the quantity reported by the network nodes as their DL power capability (compare with step 251). While the TX losses may differ in different network node designs, their effective TX power may be calibrated by the manufacturer and reported in the form that excludes uncertainty for the purposes of the HO decision process, according to some embodiments.

The parameter $C_k^{(RXUL)}$ determines the UL reception quality of the node. This loss is typically minimized by careful design of the hardware of the network node. While there may be differences in the different node designs, these differences are typically small. Hence, in some embodiments, it may be assumed that the losses in all nodes are equal, $C_1^{(RXUL)} = C_2^{(RXUL)}$. Alternatively or additionally, it may be assumed that the parameter $C_k^{(RXUL)}$ depends on $P_k^{(TXDL,\mathit{eff})}$ according to some known pattern, e.g. according to the power class (macro, micro, pico, etc.) of the node, and may hence be deduced from the reported downlink power values. Yet alternatively or additionally, $P_k^{(TXDL,\mathit{eff})}/C_k^{(RXUL)}$ may be reported instead of $P_k^{(TXDL,\mathit{eff})}$.

Other UL signal properties (e.g. average signal-to-noise ratio—SIR) may be used as uplink signal strength measurements for the handover decision.

As mentioned above, network nodes may have varying output power levels according to some embodiments. Thus, in some deployments the DL output power capability for some nodes (typically primarily low-power nodes) may not be constant over time, but may vary (e.g. depending on the network load, the need for macro offloading, power savings considerations, etc). When such a network node changes its DL output power, it typically updates its power capability information registered with other network nodes by signaling power level update messages (compare with step 251).

To keep the DL power capability information updated and aligned with the current neighbor lists, the power information may be bundled with the neighbor list message. In such approaches, the individual network nodes may signal their DL power capability to the serving node, which includes the power information with neighbor list update messages, as well as distributes it in the inter-cell procedure for updating the neighbor lists. This approach may be particularly useful when handling addition and/or removal of network nodes in the network.

In some typical future network deployment scenarios, both the network nodes and the wireless communication devices (UE) may be using advanced antenna configurations (beamforming/precoding), effectively forming directional lobes in which the signal energy is transmitted. The DL mobility process then entails constantly finding the optimal target beam as the UE moves through the coverage area. At some time instances, all candidate beams may belong to the current serving network node, in which case the DL power offset aspect is moot. At other times, other network nodes may also be involved, in which case the inter-node HO approaches elaborated on above become relevant.

As already elaborated on above (see e.g. FIG. 3) the DL power capability may not be explicitly signaled. In stead each network node may use its DL power level to compensate the UL measurements before reporting them. Then, the DL power differences are accounted for without explicit signaling of DL power capability.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a network node) comprising circuitry/logic or performing methods according to any of the embodiments. The electronic apparatus may, for example, be a base station (e.g. eNodeB) or another cellular network node, a centralized control unit or a server.

Figure 6:
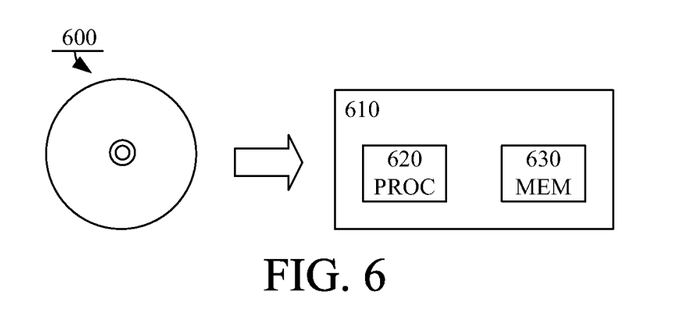
FIG. 6 is a schematic drawing illustrating a computer readable medium according to some embodiments.

According to some embodiments, a computer program product comprises a computer readable medium such as, for example, a diskette or a CD-ROM as illustrated by 600 of FIG. 6. The computer readable medium 600 may have stored thereon a computer program comprising program instructions. The computer program may be loadable into a data-processing unit (PROC) 620, which may, for example, be comprised in a network node 610. When loaded into the data-processing unit, the computer program may be stored in a memory (MEM) 630 associated with or integral to the data-processing unit. According to some embodiments, the computer program may, when loaded into and run by the data-processing unit, cause the data-processing unit to execute method steps according to, for example, the methods shown in any of the FIG. 2 or 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a handover control for a network node of a cellular communication network, the method comprising:
for each of one or more other network nodes of the cellular communication network:
receiving one or more signals from the other network node, wherein the one or more signals are indicative of:
a result of uplink signal strength measurements performed by the other network node in relation to a wireless communication device operating in association with the cellular communication network; and
an available downlink transmission power value of the other network node;
basing a handover decision on an estimated downlink received power of the wireless communication device in relation to the other network node;
wherein the estimated downlink received power is based on the result of the uplink signal strength measurements and the available downlink transmission power.

2. The method of claim 1, wherein the receiving the one or more signals from the other network node comprises:
receiving an indication of the available downlink transmission power value of the other network node; and
receiving the uplink signal strength measurements performed by the other network node.

3. The method of claim 2, further comprising compensating the uplink signal strength measurements based on the available downlink transmission power.

4. The method of claim 3, wherein the basing the handover decision on the estimated downlink received power of the wireless communication device in relation to the other network node comprises:
comparing the compensated uplink signal strength measurements of the other network node with compensated uplink signal strength measurements of a serving network node; and
determining to hand over the wireless communication device to the other network node if a ratio of the compensated uplink signal strength measurements of the other network node to the compensated uplink signal strength measurements of the serving network node exceeds a threshold value.

5. The method of claim 1, wherein the receiving the one or more signals from the other network node comprises:
receiving compensated uplink signal strength measurements;
wherein the compensated uplink signal strength measurements comprise the uplink signal strength measurements performed by the other network node compensated based on the available downlink transmission power value of the other network node.

6. A computer program product stored in a non-transitory computer readable medium for controlling a network node in a cellular communication network, the computer program product comprising software instructions which, when run on one or more processing circuits of the network node, causes the network node to:
for each of one or more other network nodes of the cellular communication network:
receive one or more signals from the other network node, wherein the one or more signals are indicative of:
a result of uplink signal strength measurements performed by the other network node in relation to a wireless communication device operating in association with the cellular communication network; and
an available downlink transmission power value of the other network node;
base a handover decision on an estimated downlink received power of the wireless communication device in relation to the other network node;
wherein the estimated downlink received power is based on the result of the uplink signal strength measurements and the available downlink transmission power.

7. A method in a cellular communication network, the method comprising:
performing, by a network node, uplink signal strength measurements in relation to a wireless communication device operating in association with the cellular communication network;
transmitting one or more signals from the network node to another network node, wherein the one or more signals are indicative of:
a result of the uplink signal strength measurements; and
an available downlink transmission power value of the network node;
wherein the result of the uplink signal strength measurements and the available downlink transmission power are for handover control by the another network node, with the handover control comprising basing a handover decision on an estimated downlink received power of the wireless communication device in relation to the other network node, wherein the estimated downlink received power is based on the result of the uplink signal strength measurements and the available downlink transmission power.

8. The method of claim 7, wherein transmitting the one or more signals comprises:
transmitting an indication of the available downlink transmission power value of the network node; and
transmitting the uplink signal strength measurements performed by the network node.

9. The method of claim 8, wherein the transmitting an indication of the available downlink transmission power value of the network node is performed in response to one or more of the following events:
the network node being activated;
a downlink transmission power value of the network node being altered;
a certain time having elapsed since a previous transmission of the indication of the available downlink transmission power.

10. The method of claim 7:
further comprising compensating the uplink signal strength measurements based on the available downlink transmission power;
wherein transmitting the one or more signals comprises transmitting the compensated uplink signal strength measurements.

11. A computer program product stored in a non-transitory computer readable medium for controlling a network node in a cellular communication network, the computer program product comprising software instructions which, when run on one or more processing circuits of the network node, causes the network node to:

perform uplink signal strength measurements in relation to a wireless communication device operating in association with the cellular communication network;

transmit one or more signals from the network node to another network node, wherein the one or more signals are indicative of:
  a result of the uplink signal strength measurements; and
  an available downlink transmission power value of the network node;

wherein the result of the uplink signal strength measurements and the available downlink transmission power are for handover control by the another network node, with the handover control comprising basing a handover decision on an estimated downlink received power of the wireless communication device in relation to the other network node, wherein the estimated downlink received power is based on the result of the uplink signal strength measurements and the available downlink transmission power.

12. A handover control arrangement for a network node configured to operate as part of a cellular communication network, the arrangement comprising:
a receiver configured to, for each of one or more other network nodes of the cellular communication network, receive one or more signals from the other network node, wherein the one or more signals are indicative of:
  a result of uplink signal strength measurements performed by the other network node in relation to a wireless communication device operating in association with the cellular communication network; and
  an available downlink transmission power value of the other network node;
a handover control circuit configured to base a handover decision on an estimated downlink received power of the wireless communication device in relation to the other network node;
wherein the estimated downlink received power is based on the result of the uplink signal strength measurements and the available downlink transmission power.

13. The arrangement of claim 12, wherein the receiver is configured to receive the one or more signals from the other network node as:
an indication of the available downlink transmission power value of the other network node; and
the uplink signal strength measurements performed by the other network node.

14. The arrangement of claim 13, wherein the handover control circuit is further configured to compensate the uplink signal strength measurements based on the available downlink transmission power.

15. The arrangement of claim 14, wherein the handover control circuit is configured to base the handover decision on the estimated downlink received power of the wireless communication device in relation to the other network node by:
comparing the compensated uplink signal strength measurements of the other network node with compensated uplink signal strength measurements of a serving network node; and
determining to hand over the wireless communication device to the other network node if a ratio of the compensated uplink signal strength measurements of the other network node to the compensated uplink signal strength measurements of the serving network node exceeds a threshold value.

16. The arrangement of claim 12:
wherein the receiver is configured to receive the one or more signals from the other network node as compensated uplink signal strength measurements;
wherein the compensated uplink signal strength measurements comprise the uplink signal strength measurements performed by the other network node compensated based on the available downlink transmission power value of the other network node.

17. An arrangement for a network node configured to operate as part of a cellular communication network, the arrangement comprising:
a measurement circuit configured to perform uplink signal strength measurements in relation to a wireless communication device operating in association with the cellular communication network;
a transmitter configured to transmit one or more signals to another network node, wherein the one or more signals are indicative of:
  a result of the uplink signal strength measurements; and
  an available downlink transmission power value of the network node;
wherein the result of the uplink signal strength measurements and the available downlink transmission power are for handover control by the another network node, the other network node configured to base a handover decision on an estimated downlink received power of the wireless communication device in relation to the other network node, wherein the estimated downlink received power is based on the result of the uplink signal strength measurements and the available downlink transmission power.

18. The arrangement of claim 17, wherein the transmitter is configured to transmit the one or more signals as:
an indication of the available downlink transmission power value of the network node; and
the uplink signal strength measurements performed by the network node.

19. The arrangement of claim 18, wherein the transmitter is configured to transmit the indication of the available downlink transmission power value of the network node in response to one or more of the following events:
the network node being activated;
a downlink transmission power value of the network node being altered;
a certain time having elapsed since a previous transmission of the indication of the available downlink transmission power.

20. The arrangement of claim 17:
further comprising a compensator circuit configured to compensate the uplink signal strength measurements based on the available downlink transmission power; and
wherein the transmitter is configured to transmit the compensated uplink signal strength measurements as the one or more signals.

21. A network node configured to operate as part of a cellular communication network, the network node comprising
one or more arrangements, each arrangement comprising:
a measurement circuit configured to perform uplink signal strength measurements in relation to a wireless communication device operating in association with the cellular communication network;
a transmitter configured to transmit one or more signals to another network node, wherein the one or more signals are indicative of:

a result of the uplink signal strength measurements; and an available downlink transmission power value of the network node;

wherein the result of the uplink signal strength measurements and the available downlink transmission power are for handover control by the another network node, the other network node configured to base a handover decision on an estimated downlink received power of the wireless communication device in relation to the other network node, wherein the estimated downlink received power is based on the result of the uplink signal strength measurements and the available downlink transmission power.

* * * * *